Jan. 21, 1969   T. C. HOVIOUS   3,423,599

FUEL BATTERY-RECHARGEABLE ACCUMULATOR COMBINATION

Filed Sept. 20, 1965

Inventor:
Thomas C. Hovious,
by Paul C. Frank
His Attorney.

United States Patent Office 3,423,599
Patented Jan. 21, 1969

3,423,599
FUEL BATTERY-RECHARGEABLE ACCUMULATOR COMBINATION
Thomas C. Hovious, Peabody, Mass., assignor to General Electric Company, a corporation of New York
Filed Sept. 20, 1965, Ser. No. 488,320
U.S. Cl. 307—66      13 Claims
Int. Cl. H02j 9/00, 7/00

ABSTRACT OF THE DISCLOSURE

A circuit arrangement is disclosed in which a fuel battery is used to meet base power requirements of a load while a rechargeable accumulator (cell, battery, or capacitor) is used to meet peak power requirements. When the terminal voltage across the accumulator falls below a predetermined level, the fuel battery recharges the accumulator. In one form a Zener diode becomes nonconductive when the accumulator potential falls below a predetermined level. This allows a solenoid switch to revert to its closed position for charging of the accumulator. Where the accumulator and fuel battery are associated with the same load, the fuel battery is center tapped so that the fuel battery is capable of supplying the necessary overvoltage for charging of the accumulator.

---

My invention relates to a new combination uniting a fuel battery and a rechargeable accumulator to efficiently supply variable electrical power requirements.

Batteries having anode and cathode reactants supplied from an external source continuously or on demand are termed fuel batteries Such batteries have attracted a great deal of interest since they do not become discharged thereby requiring periodic recharge as in the case of secondary batteries or periodic replacement as in the case of primary batteries.

Fuel batteries may be sized to meet any desired power requirement. However, as an economic matter, fuel batteries incorporate significant amounts of expensive noble metals. Accordingly substantial economic penalities are incurred in sizing fuel batteries to meet transient or periodic peak loads which are much larger than the normal operating load.

It is an object of my invention to provide an arrangement for efficiently meeting both the base and peak power requirements of an external electrical load.

It is an additional object of my invention to provide an arrangement for continuously supplying electricity to a unit having a low power requirement and periodically supplying electricity to another unit having a high power requirement.

These and other objects of my invention are accomplished by connecting like terminals of a fuel battery and a rechargeable accumulator to form an electrical circuit. The circuit is provided with a low impedance biased controlling means and means shunting the circuit capable of imparting a high impedance to the cotrolling means in response to a potential across the accumulator in excess of a reference potential. Electricity may be delivered externally through terminal connections and by tapping the fuel battery intermediate its terminals.

Figure 1:
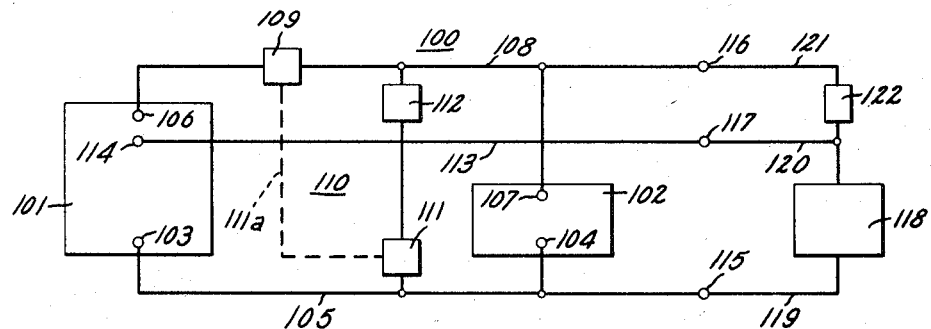
Figure 2:
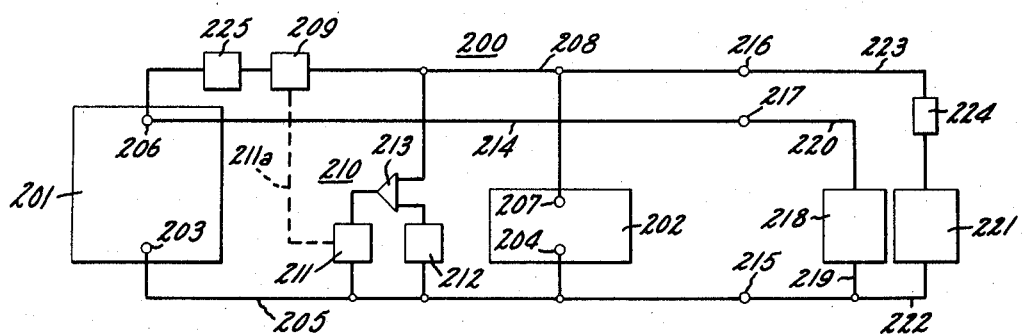

My invention may be more fully understood by reference to the following detailed description read in conjunction with the drawings, in which FIGURE 1 is a circuit diagram of one form of my apparatus, and FIGURE 2 is a circuit diagram of an alternate form of my apparatus.

As herein used, the term "battery" designates a unit comprised of a plurality of cells. The term "fuel battery" designates a unit comprised of a plurality of series-connected fuel cells, and the term "secondary battery" designates a unit comprised of a plurality of rechargeable cells.

FIGURE 1 schematically illustrates an electrical circuit 100 including a fuel battery 101 and a rechargeable accumulator 102. Terminals 103 and 104 of the fuel battery and accumulator respectively are of like polarity and are joined by a first conducting means 105. Terminals 106 and 107 of the fuel battery and accumulator respectively are similarly of like polarity and are joined by a second conductive means 108. A controlling means 109 having a high impedance state and a low impedance state and being normally biased toward the low impedance state, hereinafter referred to as low impedance biased controlling means, forms a portion of the second conductive means.

A control unit 110 is connected to the first conductive means and the second conductive means between the controlling means and the terminal 107. This unit is comprised of an actuator 111 connected in series relation with a reference element 112. As schematically illustrated by dashed line 111a, the actuator is associated with the controlling means so that the latter may be selectively switched from its low impedance state to its high impedance state.

In order to illustrate the application of my inventive circuit, third conducting means 113 is shown connected to the fuel battery mediate the terminals at tap 114. The first, second, and third conducting means are shown attached to connectors 115, 116, and 117, respectively. An electrical device 118 having variable power requirements is attached to connector 115 by lead 119 and to connector 117 by lead 120. Lead 121 electrically connects the device with connector 116 through a switch 122.

To illustrate the scope of my invention, FIGURE 2 shows an electrical circuit 200 comprised of a fuel battery 201 and a rechargeable accumulator 202. Terminals 203 and 204 of the fuel battery and accumulator respectively are of like polarity and are joined by a first conducting means 205. Terminals 206 and 207 of the fuel battery and accumulator respectively are similarly of like polarity and are joined by a second conductive means 208. A low impedance biased controlling means 209 similar to controlling means 109 forms a portion of the second conductive means. Also forming a part of the second conductive means is a current control device 225 capable of limiting current through the conducting means.

A control unit 210 is connected to the first conductive means and the second conductive means between the controlling means and the terminal 207. This unit is comprised of an actuator 211, a reference element 212, and an amplifier 213. Dashed line 211a illustrates an operative association between the controlling means and actuator so that the controlling means can be switched from its low impedance state to its high impedance state.

To illustrate the application of my circuit, a third conductive means 214 is shown connected to terminal 206 of the fuel battery. The first, second and third conductive means are attached to connectors 215, 216, and 217, respectively. An electrical device 218 having low power requirements is attched to connectors 215 and 217 by leads 219 and 220. An electrical device 221 having high power requirements is attached to connectors 215 and 216 through leads 222 and 223. Switch 224 is connected in series with the high power requirement device.

My invention requires no elements which are in themselves new but rather relates to a new combination of conventional means. My invention may be practiced with any fuel battery. In applications where it is desired to tap the battery mediate the terminals, this may be accomplished merely by establishing electrical contact with an electrode, current collector, or other structural element lying at a potential intermediate that of the terminals.

It is immaterial whether the battery is tapped at an anode or a cathode. The relationship of the potential difference between the terminals and the tap will depend on the number of cells separating each tap and the terminal. The number of cells employed and the position of the tap will vary, of course, depending on the particular voltage and power requirements of a specific application.

The rechargeable accumulators employed in the practice of the invention include known devices capable of storing an appreciable electrical charge and of delivering a direct current or pulse. Typical rechargeable accumulators include capacitors as well as secondary cells and batteries. Nonrechargeable accumulators such as primary cells or batteries are unsuitable for the practice of my invention.

The circuit controls may be chosen from a wide variety of conventional elements. Suitable reference elements include those having low conductivity below a predetermined or reference potential, and a markedly increased conductivity above the reference potential. Numerous reference elements of this type are well known and understood in the art including stabistors, such as Zener diodes; non-linear resistors; gas-filled reference tubes, such as neon and xenon tubes, etc. Zener diodes having a Zener voltage corresponding to the reference potential are generally most preferred. The low impedance biased controlling means employed may take the form of any one of a variety of conventional switch arrangements. The actuator may be constructed integrally with the controlling means or as a separate unit. For example, the controlling means may take the form of a switch and the actuator the form of a solenoid acting against spring force, gravity, etc., to actuate the switch from its biased closed or low impedance state to an open or high impedance state. In another arrangement, controlling means may be comprised of the spaced electrodes of an electron discharge device in which the actuator selectively controls a biasing grid operable to control conductivity between the electrodes. In still another arrangement, the actuator may be a separate unit connected to the switching means by an electrical circuit controlling actuation of the switch. The amplifier is preferably a semiconductor device such as a transistor or tunnel diode although gas-filled and vacuum tube amplifiers may also be conveniently employed. The current control device may be a resistor, rheostat, base current regulator, or any other conventional current limiting control. Preferably the current control device is adjustable to various limiting currents.

To illustrate a specific use, a device 118 having base and peak power requirements is connected into the circuit shown in FIGURE 1. A fuel battery is employed having a potential difference between the terminal 103 and the tap 114 corresponding to the desired potential difference across device 118. A secondary battery 102 having a potential difference across terminals 104 and 107, corresponding to the potential difference between terminal 103 and tap 114, is placed in the circuit. The number of cells employed in the fuel battery is chosen so that the potential difference between terminals 103 and 106 will exceed the potential across terminals 104 and 107 by an amount sufficient to permit recharging of the secondary battery.

When the device 118 is operating at base power requirements, the low impedance biased controlling means 109 and the switch 122 are open. Power is supplied to the device at a desired voltage from terminal 103 and tap 114 of the fuel battery. When peak power is required by the device, switch 122 is closed thereby allowing the device to receive power additionally from the secondary battery. When the peak power requirement is terminated, the switch 122 is opened and the fuel battery continues to supply the base power requirement.

If during supplying the peak power requirement the secondary battery has become substantially discharged, this will be detected by reference element 112. If the secondary battery is sufficiently discharged that the potential difference across the terminals 104 and 107 is below a predetermined or reference voltage, the conductivity of the reference element will decrease so that electrical current through the reference element and actuator 111 becomes negligible. With no current flowing, the actuator becomes inactive allowing controlling means 109 to return to its normal, low impedance biased position. This closes the electrical circuit 100 joining the fuel battery and secondary battery. The fuel battery is then capable of recharging the secondary battery simultaneously with meeting the base power requirements of the device 118.

When the secondary battery has achieved a full charge, the potential difference across terminals 104 and 107 will again exceed the reference potential, and the reference element will show an increase in conductivity sufficient to allow passage of an appreciable current therethrough. This current causes the actuator to impart a high impedance to the controlling means 109. The operating cycle of the apparatus is thus complete, and the apparatus ready to again meet peak power requirements.

Another specific application of my invention is described with reference to FIGURE 2. A device 218 having a low power requirement is placed in the combination shown along with a device 221 having a noncontinuous high power requirement. Also, the device 221 may be one chosen to operate at a voltage substantially below that of device 218. A fuel battery 201 is chosen having a potential across terminals 203 and 206 corresponding to the potential difference desired across device 218. Similarly a rechargeable accumulator 202 is employed capable of developing a potential across terminals 204 and 207 corresponding to the potential required across device 221.

In operation, electrical power is supplied to device 218 by fuel battery 201. At this time controlling means 209 and switch 224 are open and no power is being supplied to device 221. When it is desired to operate device 221, switch 224 is closed. The noncontinuous high power requirement of device 221 is then supplied by rechargeable accumulator 202. When the power requirements of device 221 have been met, switch 224 is again opened. At this point reference element 212 exhibits a low conductivity in response to the decreased potential difference across terminals 204 and 207 of the accumulator. This prevents the passage of appreciable current through the amplifier 213 and essentially prevents current passage through the actuator 211. With the actuator 211 inactive, the low impedance biased controlling means returns to the low impedance state and the circuit 200 is closed connecting the accumulator and fuel battery. This allows the accumulator to be recharged. The current control device 225 allows the accumulator to be recharged at any desired rate. Where a substantial time period between successive uses of the accumulator are anticipated, the charging current may be maintained at a low level, if desired. Such charging rate may be used with particular advantage on accumulators showing a tendency toward self-discharge upon standing. Alternately, the current control device may be chosen or selectively adjusted to permit rapid recharging of the accumulator. When the initial potential difference between terminals 204 and 207 is substantially restored, the conductivity of the reference element increases so that an appreciable current is passed through the amplifier and actuator. This allows the actuator to impart a high impedance to the controlling means, and the cycle of operation is complete.

The foregoing description of my invention is merely intended to illustrate certain preferred embodiments. Numerous variations of a type obvious to a person skilled in the art may be undertaken with respect to the preferred embodiments without departing from the purview of my invention. For example, the control units 110 and 210 may be interchanged. The control unit 110 is shown to illustrate that the amplifier 213 is not a necessary element of the combination. In certain applications it may be desirable to utilize the actuator 111 as the only element of the control unit 110. Generally, however, it is preferred to use a reference element and an amplifier in combination with an actuator. Current control device 225 could be used in connector 108 equally as well as in connector 208. While the application of circuit 100 is described with particular reference to a secondary battery, it is appreciated that any rechargeable accumulator may be employed in the circuit. If the rechargeable accumulator 102 is a capacitor, it may be desirable to connect the conducting means 113 to the fuel battery terminal 106 rather than to the tap 114, since no appreciable overvoltage is required to charge a capacitor. In the event it is desired to operate device 221 at the same potential as device 218 and to use a secondary cell or battery as the accumulator 202, the connecting means 214 could be easily connected to a tap at the fuel battery rather than to terminal 206. It is appreciated that device 118 could be used with circuit 200 and circuit 100 used with devices 218 and 221. The connectors are, of course, useful when the circuitry to their left is packaged separately from the power requireing devices and circuitry to their right.

It is intended that the scope of my invention be determined by reference to the following claims.

What I claim as new and desire to secure by Letters Patent of the United States is:

1. The combination comprising
   a fuel battery having positive and negative terminals,
   a rechargeable accumulator having positive and negative terminals,
   means connecting like terminals of the fuel battery and the accumulator to form an electrical circuit,
   a low impedance biased controlling means in said circuit, and
   means shunting the accumulator terminals capable of imparting a high impedance to said controlling means in response to a potential across the accumulator terminals in excess of a reference potential.

2. The combination according to claim 1 in which the rechargeable accumulator is a secondary battery.

3. The combination according to claim 1 in which the rechargeable accumulator is a secondary cell.

4. The combination according to claim 1 in which the rechargeable accumulator is a capacitor.

5. The combination according to claim 1 in which the shunting means is comprised of actuator means capable of imparting a high impedance to said controlling means, and a reference means having a low conductivity above the reference potential.

6. The combination according to claim 1 in which the shunting means is comprised of actuator means capable of imparting a high impedance to said controlling means, and a Zener diode having a Zener voltage corresponding to the reference potential.

7. The combination according to claim 1 in which the shunting means is comprised of a solenoid capable of imparting a high impedance to said controlling means, and a reference means having a low conductivity below a reference potential, and increased conductivity above the reference potential.

8. The combination according to claim 1 additionally including means tapping said fuel battery intermediate its terminals.

9. The combination according to claim 1 additionally including
   means tapping said fuel battery intermediate its terminals,
   an electrical device having base and peak power requirements,
   means electrically connecting said device to said tapping means and a terminal of said fuel battery, and
   means including a current limiting means electrically connecting said device across the terminals of said rechargeable accumulator.

10. The combination according to claim 1 additionally including
    an electrical device having a low power requirement,
    an electrical device having a noncontinuous, high power requirement,
    means connecting the low power requirement device across the terminals of said fuel battery, and
    means including a current limiting means connecting the high power requirement device across the terminals of said accumulator.

11. The combination according to claim 1 in which the shunting means is comprised of an amplifier having an input and an output leg, actuator means connected to the output leg capable of imparting a high impedance to said switching means, and a reference means having a low conductivity below a reference potential and increased conductivity above the reference potential, said reference means being connected to the input leg.

12. The combination according to claim 1 in which the means connecting like terminals of the fuel battery and the accumulator includes means for limiting current flow.

13. The combination according to claim 1 in which the means connecting like terminals of the fuel battery and the accumulator includes adjustable means for selectively limiting current flow.

References Cited

UNITED STATES PATENTS 940,008  11/1909  Gugler _____ 320—3

ROBERT K. SCHAEFER, *Primary Examiner.*

H. J. HOHAUSER, *Assistant Examiner.*

U.S. Cl. X.R.

320—15